United States Patent
Brenner et al.

(10) Patent No.: US 10,409,692 B1
(45) Date of Patent: Sep. 10, 2019

(54) GARBAGE COLLECTION: TIMESTAMP ENTRIES AND REMOVE REFERENCE COUNTS

(71) Applicant: EMC IP Holding Company LLC, Hopkinton, MA (US)

(72) Inventors: Adam Brenner, Lake Forest, CA (US); Jeffrey Norton, Laguna Niguel, CA (US); Jennifer Starling, Lake Forest, CA (US); Mark Malamut, Dana Pointe, CA (US); Junxu Li, Pleasanton, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/650,651

(22) Filed: Jul. 14, 2017

(51) Int. Cl.
   *G06F 13/00* (2006.01)
   *G06F 11/14* (2006.01)
   *G06F 12/02* (2006.01)

(52) U.S. Cl.
   CPC ...... *G06F 11/1451* (2013.01); *G06F 12/0253* (2013.01)

(58) Field of Classification Search
   CPC combination set(s) only.
   See application file for complete search history.

(56) References Cited

U.S. PATENT DOCUMENTS

| | | | | |
|---|---|---|---|---|
| 8,301,671 B1* | 10/2012 | Greenwood | ........ | G06F 11/2094 707/813 |
| 2011/0191566 A1* | 8/2011 | Takamiya | ............... | G06F 12/10 711/206 |
| 2013/0282954 A1* | 10/2013 | Sankar | .................... | G06F 3/061 711/103 |
| 2014/0101113 A1* | 4/2014 | Zhang | ................. | G06F 11/1453 707/692 |

* cited by examiner

*Primary Examiner* — Yong J Choe
(74) *Attorney, Agent, or Firm* — Womble Bond Dickinson (US) LLP

(57) ABSTRACT

One embodiment is related to a method for performing garbage collection at a backup system, comprising: determining an object that is present in a preceding backup but is no longer present in a present backup when or after the present backup is made; associating an indicator indicative of the preceding backup with the object in response to the determination that the object is no longer present in the present backup; determining whether the object is to be deleted from the backup system based on the indicator and a policy during garbage collection; and deleting the object in response to determining that the object is to be deleted.

21 Claims, 5 Drawing Sheets

GARBAGE COLLECTION: TIMESTAMP ENTRIES AND REMOVE REFERENCE COUNTS

FIELD OF THE INVENTION

Embodiments of the disclosure are related to electronic devices, and more particularly, to a method, apparatus, and system for improving efficiency in a garbage collection process in a data backup system.

BACKGROUND

Data backup systems (e.g., those made by Dell EMC) may use deduplication of metadata and data to reduce the amount of stored data by orders of magnitude. Typically, stale backups may be deleted according to user-supplied or default retention policies (e.g., backups that are 10 days old or older are deleted). When the deletion of one or more backups results in data or metadata objects being no longer referenced by any of the remaining backups, these "orphaned" objects may be deleted through a process known as "garbage collection." In other words, metadata and data objects are only kept for certain periods of time as determined by retention policies after they are last present in a backup and are no longer present in later backups. For example, if a metadata object was last seen in a backup that is 10 days old (e.g., the metadata object and the associated data object were deleted by the user 9 days ago, in a daily backup scenario), and the policies dictate that backups be kept for 10 days, the metadata object in the backup system may be deleted. In other words, once a metadata or data object has expired, it is deleted using the garbage collection process.

The traditional mark and sweep algorithm for garbage collection for metadata objects does not scale efficiently with "big data" when the number of objects approaches billions. The "mark" query, which is used to find elements for deletion in the metadata catalog, does an entire table/object scan and counts references. It does this to determine what objects should be deleted. The "mark" query is expensive, computationally and time wise, and does not scale because of the entire table/object scan.

In addition, the "marking" phase in mark and sweep requires that backups be held off so that data used by subsequent backups is not inadvertently "swept" away (i.e., deleted) due to a bad "mark." A bad "mark" can occur if a backup runs during the "marking" phase. While there are schemes that prevent backups from running such as segregating the backup data into separate containers or indices, these methods add complexity and to some degree negatively affect performance.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the invention relate to an apparatus, method, and system for performing a garbage collection process at a backup system. According to the embodiments, reference counts need not be used for the purpose of garbage collection. At the backup system, an object (either metadata or data object) may be associated with an indicator indicative a backup in which the object is last present (e.g., the backup preceding the first backup made after the object has been deleted or modified at the source system), and a determination may be made whether the object is to be deleted based on the indicator and a policy. In other words, the indicator indicates that the object is not present in any of the later backups than the indicated backup. The indicator may be generated and associated with the object at the time or after each backup is made. The indicator may comprise a property associated with the object that indicates the backup in which the object is last present (with the time of the backup or any other suitable identifier of the backup). In another embodiment, the indicator may comprise values of cells in a row corresponding to the object in a bitmap table, wherein the columns of the bitmap table correspond to backups. If it is determined that the object is to be deleted based on the indicator and the policy, the object is deleted in the garbage collection process.

Figure 1:
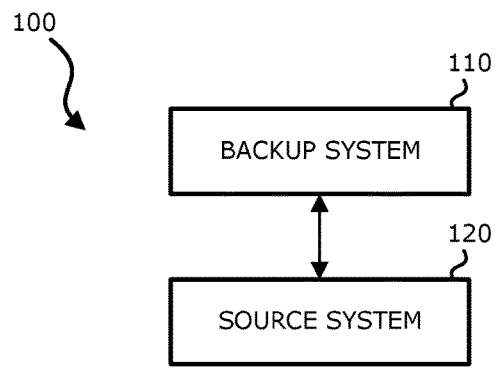
FIG. 1 is a block diagram illustrating an example environment in which embodiments of the invention may be practiced.

Referring to FIG. 1, a block diagram illustrating an example environment 100 in which embodiments of the invention may be practiced is shown. The environment 100 comprises a backup system 110 and a source system 120. The backup system 110 and the source system 120 are connected via a suitable data connection. From time to time or periodically, data and metadata from the source system 120 may be copied ("backed up") to the backup system 110 for safekeeping. It should be appreciated that the backup system 110 may not be limited to a single piece of hardware and may comprise any suitable combination of hardware and software to perform its functions. To reduce data traffic and/or save storage space at the backup system 110, the technique of incremental backup may be used. Further, the backup system 110 may perform deduplication on the backups stored thereon. In other words, an object that is present in more than one backups is nonetheless stored only once, and the single copy of the object may be referenced by the backups in which the object is present. It should be further appreciated that the backup system 110 may serve additional source systems, and the number of source systems does not limit the invention.

Figure 2:
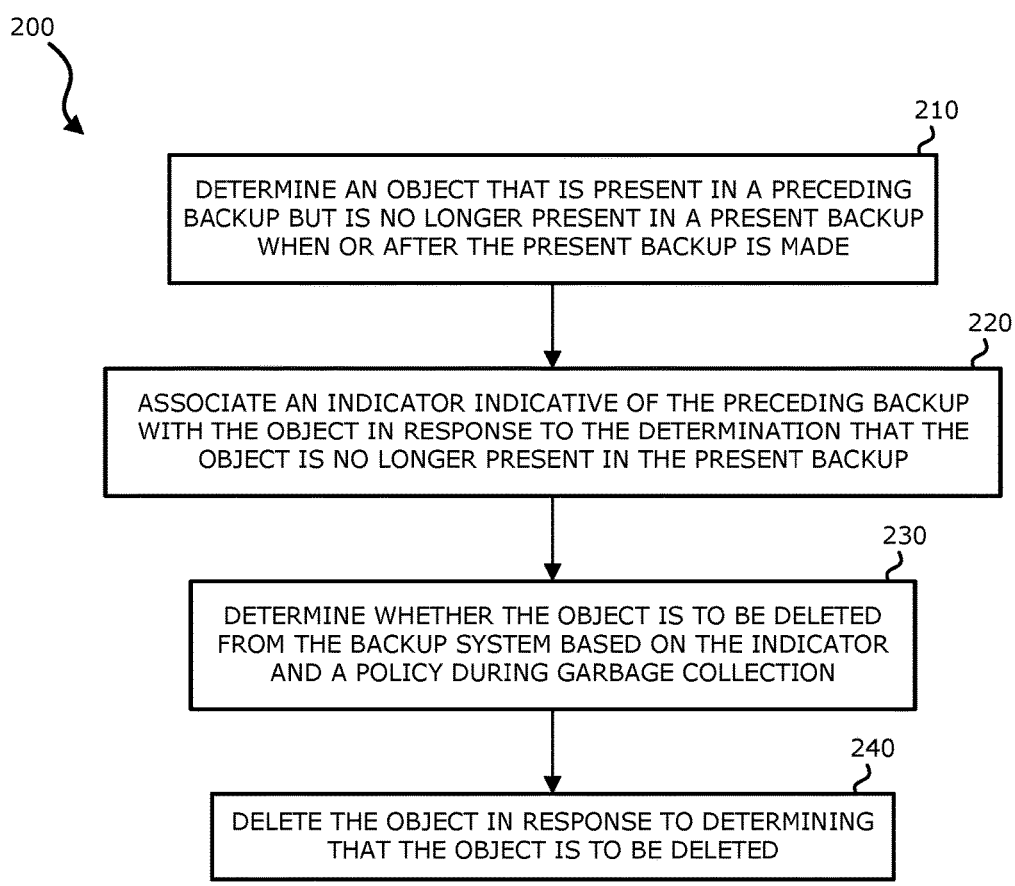
FIG. 2 is a flowchart illustrating an example method for performing garbage collection at a backup system.

Referring to FIG. 2, a flowchart illustrating an example method 200 for performing garbage collection at a backup system is shown. At block 210, when or after a present backup is made, an object that is present in a preceding backup but is no longer present in the present backup may be determined. At block 220, an indicator indicative of the preceding backup may be associated with the object in response to the determination that the object is no longer present in the present backup. At block 230, during garbage collection, whether the object is to be deleted from the backup system may be determined based on the indicator and a policy. At block 240, in response to determining that the object is to be deleted, the object may be deleted. The indicator may comprise a property associated with the object that indicates the the backup in which the object is last present (i.e., the preceding backup in method 200) (with either the time of the backup or any other suitable identifier of the backup). In another embodiment, the indicator may comprise values of cells in a row corresponding to the object in a bitmap table, wherein the columns of the bitmap table correspond to backups.

In one embodiment, each data or metadata object (e.g., file, directory, composite, etc.) (a composite references a plurality of data blocks that store data of a directory, and is useful for directories with a large number of files) on the backup system may be associated with two properties indicative of the backup in which the object is first added and the backup in which the object is last present (i.e., the object is no longer present in later backups), respectively. For the sake of brevity, the two properties may be referred to hereinafter as properties FirstSeen (or the first property) and LastSeen (or the second property), respectively. It should be appreciated that the invention is not limited by the names of the properties used.

In one embodiment, when a new object is added to the backup system as a part of a backup, the FirstSeen property for the object is set to the start time of the backup (either an initial, also known as "level-0" backup, or an incremental backup), and the LastSeen property is left empty (null). When a later, incremental backup is performed, as with the conventional approach, the last successful backup is compared with the new data from the incremental backup. The union of the two datasets is performed to create the incremental objects within the backup catalog. Objects (e.g., files, directories, composites, etc.) that are no longer present in the later incremental backup (e.g., files that have been deleted or modified at the source system) are identified (It should be appreciated that a modified object at the source system may correspond to a deleted object and a new object at the backup system.). These identified objects may be marked and their LastSeen property set to the time of the preceding successful backup, which is the backup in which the objects are last present. In one embodiment, the time in FirstSeen and LastSeen properties may be represented in Portable Operating System Interface (POSIX) time (also known as epoch time). It should be appreciated that the time representation used does not limit the invention. Other time representations, such as Microsoft time or any suitable representation, may also be used.

It should be further appreciated that in some embodiments, the FirstSeen and LastSeen properties may comprise information that indicates backups not through the time of the backups, but through any other suitable means (e.g., backup hash values, or other backup identifiers, etc.).

In other words, in the above embodiment, the LastSeen property is utilized to mark items for deletion (e.g., during garbage collection with a 10-day retention policy at the backup system, the objects with a LastSeen property indicating a backup that is 10 days old or older can be deleted). It should be appreciated that the comparison of dates (as represented in POSIX time) is usually optimized for efficiency in a database management system (DBMS) or a key/value store (It should be noted that the metadata catalog typically is implemented with a DBMS or a key/value store.). On the other hand, a DBMS usually does not natively understand the concept of reference counts, and the mark and sweep-based garbage collection process with reference counts usually has to be done from the application side. The end result is that with a conventional mark and sweep-based garbage collection approach, multiple database queries are required to determine whether an object is to be retained, whereas if the LastSeen property described above is utilized, only one query is required.

Therefore, the difference in query and metadata properties may lead to a significant performance increase (computationally and time wise) for garbage collection. While updating data (e.g., the LastSeen property) may go against the norm in relevant backup system products, it is a trade-off that could be worth it for most workflows to make garbage collection an efficient process and meet maintenance windows.

The embodiments of the invention described above have the ability to scale with billions of objects. Faster and more efficient queries lead to less time spent performing garbage collection within a maintenance window. Further, the extra storage requirements for the extra FirstSeen and LastSeen properties are negligible, especially in view of the rapid decrease in storage costs.

The FirstSeen and LastSeen properties may also be utilized to efficiently find what objects (e.g., files, directories, composites, etc.) are present in any number of backups: an object with an empty LastSeen property is present in all backups made after the backup indicated by the FirstSeen property, whereas an object with a set LastSeen property is present in backups made between the backup indicated by the FirstSeen property and that indicated by the LastSeen property. In other words, only the faster and more efficient time comparisons (in embodiments where FirstSeen and LastSeen properties indicate backups through the time of the backups) are required for the task as opposed to the slower tree walk or table scan that would be required absent the FirstSeen and LastSeen properties.

Figure 3A:
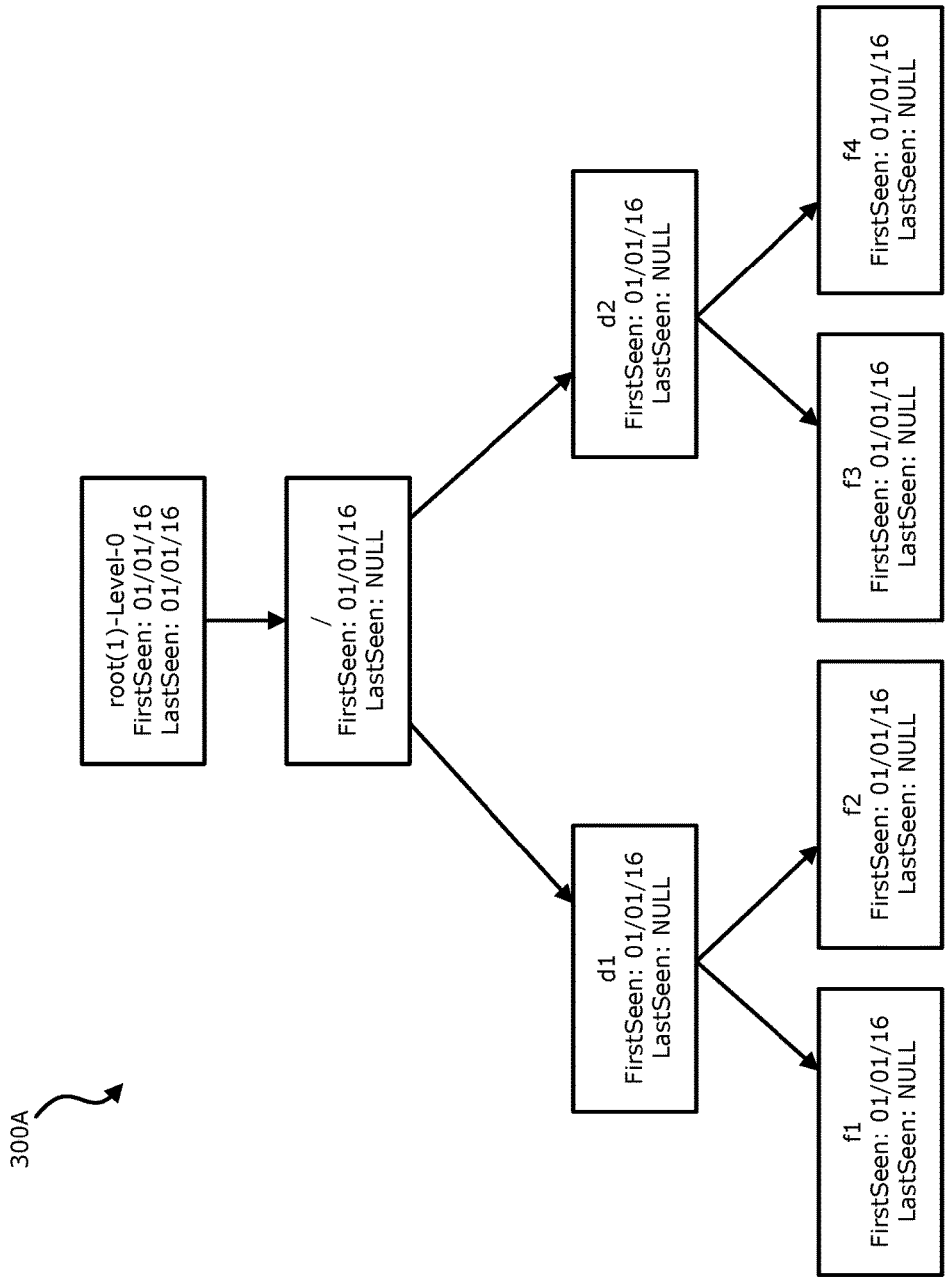
FIGS. 3A and 3B are example tree diagrams illustrating metadata catalogs implementing FirstSeen and LastSeen properties.
Figure 3B:
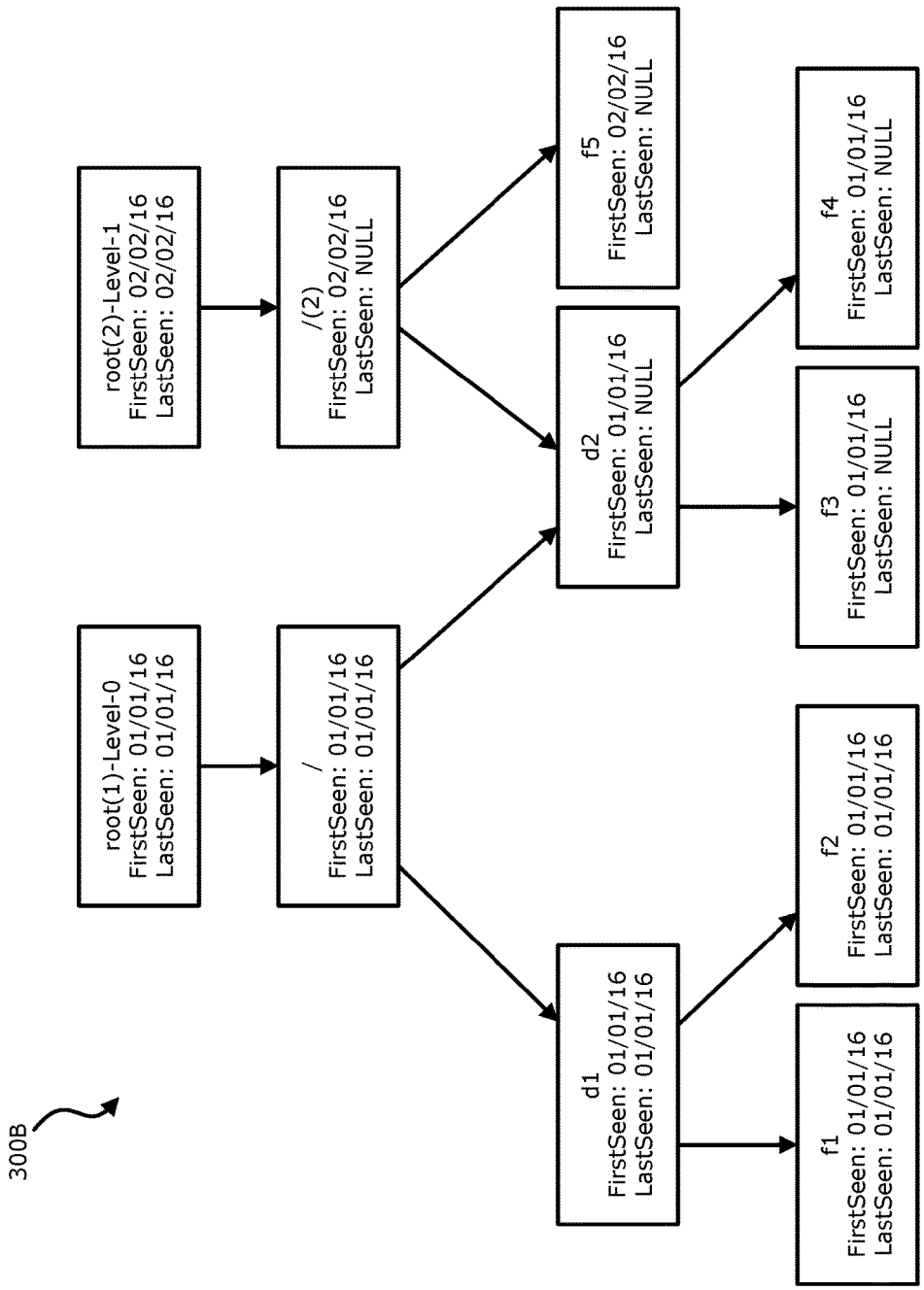

Referring to FIGS. 3A and 3B, example tree diagrams illustrating metadata catalogs 300A, 300B implementing FirstSeen and LastSeen properties are shown. FIG. 3A shows a metadata catalog 300A that is created after an initial (i.e., "level-0") backup is made. The FirstSeen property for all objects (including root(1), /, d1, f1, f2, d2, f3, and f4) is set to coincide with the time of backup (i.e., the time of the root object "root(1)"), which is 01/01/2016 in this example. The LastSeen property is set to NULL (empty) for all objects except the root object. It should be appreciated that because the root object is always unique for each backup, its LastSeen property can be set at the time of insertion.

FIG. 3B shows a metadata catalog 300B, which is the metadata catalog after a first incremental ("level-1") backup is made. In the level-1 backup, a new file named f5 is added under the/file (directory), and the file (directory) d1 including files f1 and f2 under it are deleted. Accordingly, the root object for the level-1 backup root(2), the object/(the version in the level-1 backup), and the object f5 have their FirstSeen properties set to the time of the level-1 backup, which is 02/02/2016 in this example. Further, the objects/(the version in the level-0 backup), d1, f1, and f2 have their LastSeen properties set to the time of the level-0 backup (01/01/2016), because these objects are no longer present in the level-1 backup, and the level-0 backup is the preceding backup in which these objects are last present. If another incremental backup, the level-2 backup (not shown), occurs, and objects d2, f3, and f4 no longer exist in the level-2 backup, these objects will have their LastSeen properties set to the time of the level-1 backup, which is 02/02/2016 in this example. The LastSeen property can be utilized to determine which objects are to be deleted in a garbage collection process, as described in detail above.

In another embodiment, a bitmap table rather than the FirstSeen and LastSeen properties may be utilized to indicate the status of objects. It is assumed that for each backup, a list of file system changes (or a file system change list) including all files added and deleted since the previous backup is available and provided. It should be appreciated that a changed file corresponds to a delete and a separate add entry in the list.

The embodiment may be visualized using a spreadsheet model where each row of the table corresponds to a particular object (e.g., a file, directory, composite, etc.) in the backup system, which can be represented by its hash, and each column of the table corresponds to a single backup (either initial or incremental). The value of each cell of the table (which is an intersection of a row and a column) is an indicator bit indicative of whether the corresponding object is present in the corresponding backup: a "1" may indicate that the object is present in the backup, whereas a "0" may indicate that the object is not present in the backup. Of course, it should be appreciated that other schemes for representing the same information in a table may be utilized without deviating from the scope of the disclosure. For example, in a different embodiment, rows may correspond to backups and columns may correspond to objects. In yet another embodiment, the presence and absence of an object in a backup may be encoded with a different scheme than described above.

When the initial full (level-0) backup is created, a bitmap table is generated that is 1-column wide where the rows correspond to objects (which can be represented by their hashes) and the value of each cell is set to 1. For each incremental backup, the preceding column is duplicated as a new column and then modified in accordance with the file system change list. Each added object results in a new row being added in the table, while each object deletion causes the value of the corresponding cell in the new column to be set to 0. By simply adding a new column for each additional backup, updates to the table, which can be expensive, can be minimized.

Accordingly, when a backup is deleted from the backup system, the corresponding column of the table may be removed. It should be appreciated that the backup in which an object is last present before the object is no longer present in the next backup can be determined by identifying the column of the cell in the row corresponding to the object that has a value of 1 and is followed by a cell in the next column and in the same row that has a value of 0. Therefore, the backup in which the object is last present before it is no longer present in the next backup can be determined accordingly. And garbage collection can be performed based on the time of the backup in which the object is last present and the retention policy.

Figure 4A:
FIGS. 4A-4C are diagrams illustrating example bitmap tables indicative of the status of objects in backups.
Figure 4B:
Figure 4C:

Referring to FIGS. 4A-4C, diagrams illustrating example bitmap tables 400A-400C indicative of the status of objects in backups are shown. Table 400A of FIG. 4A reflects the status of objects after a first backup is made. Three rows of table 400A correspond to three new objects in the first backup, F1, F2, and F3, respectively, which may be represented by their hash values. As objects F1, F2, and F3 are present in the first backup, each of the corresponding cells in the column corresponding to the first backup has a value of 1.

Table 400B of FIG. 4B reflects the status of objects after a second backup is made. In the second backup, the object F2 is deleted, and a new object F4 is added. In table 400B, the column corresponding to the first backup is left unchanged. A new row for the object F4 is added. Further, a new column is added corresponding to the second backup. As the objects F1, F3, and F4 are present in the second backup, cells in rows corresponding to them and in the column corresponding to the second backup have a value of 1. The cell in the row corresponding to the object F2 and in the column corresponding to the second backup has its value set to 0 as the object F2 is no longer present in the second backup. It should be appreciated that because the cell in the row corresponding to the object F2 and in the column corresponding to the first backup has a value of 1 and is followed by a cell in the same row and in the next column (i.e., the column corresponding to the second backup) that has a value of 0, it can be determined accordingly that the first backup is the backup the object F2 is last present before it is no longer present in the next backup (i.e., the second backup).

Table 400C of FIG. 4C reflects the status of objects after a third backup is made. In the third backup, objects F1, F3, and F4 are left unchanged, and a new object F5 is added. In table 400C, columns corresponding to the first and second backups are left unchanged. A new row for the object F5 is added. Further, a new column is added corresponding to the third backup. As the objects F1, F3, F4, and F5 are present in the third backup, cells in rows corresponding to them and in the column corresponding to the third backup have a value of 1. The cell in the row corresponding to the object F2 and in the column corresponding to the third backup has a value of 0 that was copied over from the cell in the same row and in the preceding column (i.e., the column corresponding to the second backup), which is correct as the object F2 is not present in the third backup.

As many modern databases (e.g., NoSQL) allow for the optional existence of rows and/or columns, the efficiency of using the bitmap table to track the status of objects across backups, as described in detail above, is apparent. A new backup requires making a copy of the preceding column, adding rows for each added object, and setting to 0 the cells in the new column for each deleted object. If the hashes of the objects can be ordered in some form (e.g., sorted), then the deleted objects can be updated while in memory using a paging scheme to walk through the prior column (corresponding to the prior backup).

When a backup is removed (either manually or according to a retention policy), then by merging all cells by row, it is easy to find all objects (e.g., object F2 in the example illustrated in FIG. 4A-4C) that no longer have any references and therefore can be safely deleted. In other words, garbage collection may be efficiently performed based on the bitmap table described herein.

In one embodiment, the bitmap table may not contain information relating to every backup for all time. A look-aside table may be utilized to map a backup number to a particular backup identifier (or label, timestamp, etc.). If it is acceptable to limit the number of backups (e.g., a limit of 1024 backups), then a wrap-around pointer can be used to indicate the most recent backup and new backups would be written similar to a circular queue.

Method 200 may be performed by processing logic that includes hardware (e.g. circuitry, dedicated logic, etc.), software (e.g., embodied on a non-transitory computer readable medium), or a combination thereof. For example, method 200 may be performed by processors 1501 of FIG. 5. Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Therefore, embodiments of the disclosure are related to improving efficiency in the garbage collection process in a data backup system. A data or metadata object may be associated with an indicator indicative of a backup in which the object is last present. In other words, the indicator indicates that the object is not present in any of the later backups than the indicated backup. Accordingly, whether the object is to be deleted can be determined based on the indicator and a retention policy. With the indicator, optimized database operations can be leveraged, and more expensive mark and sweep and reference counts can be done away with. Accordingly, the efficiency of the garbage collection process is improved.

Figure 5:
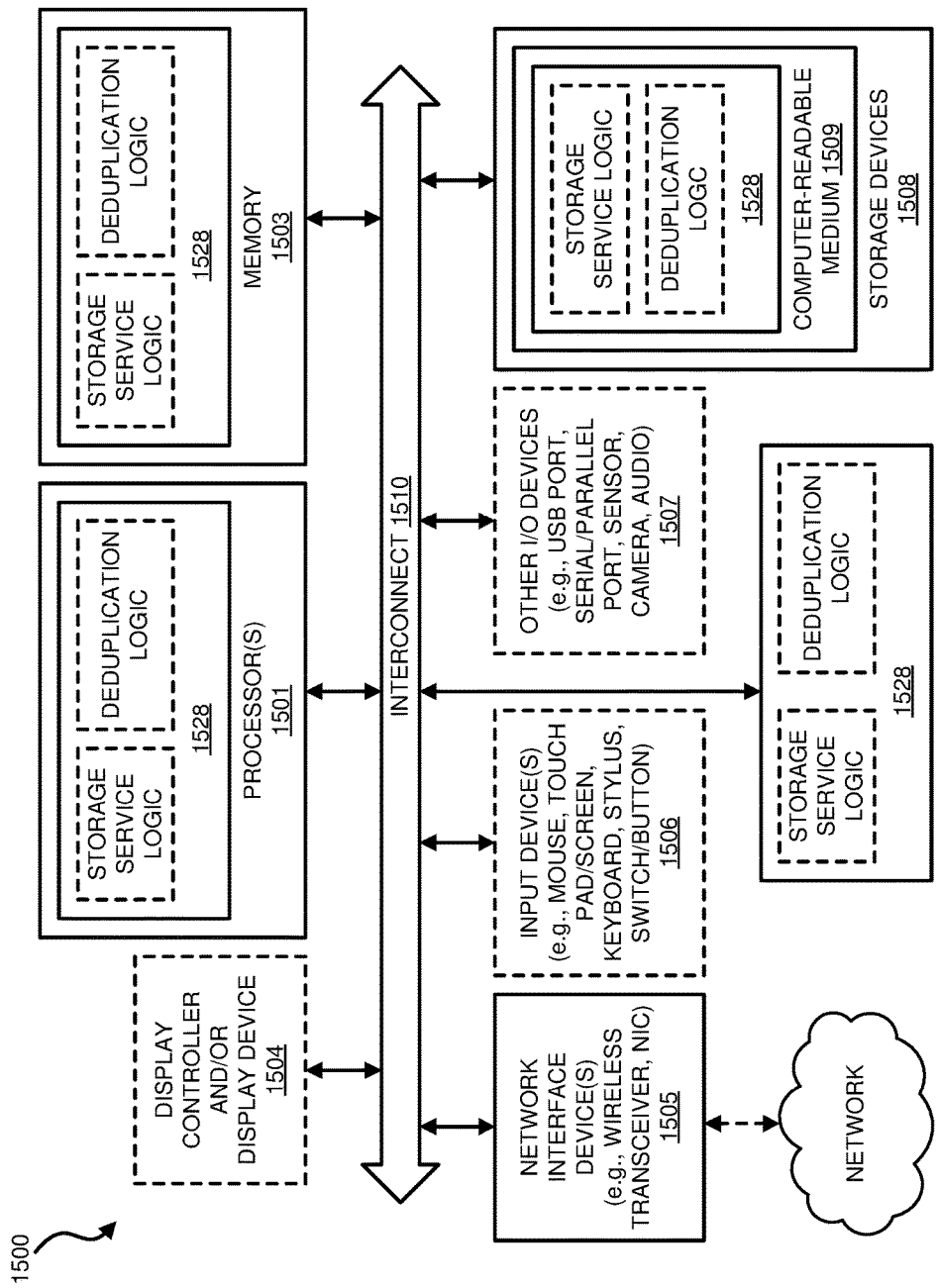
FIG. 5 is a block diagram illustrating an example of a data processing system which may be used with one embodiment of the disclosure.

FIG. 5 is a block diagram illustrating an example of a data processing system 1500 which may be used with one embodiment of the disclosure. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for performing garbage collection at a backup system, comprising:
    associating each of a plurality of objects on the backup system with a first property and a second property, wherein the first property indicates a first previous backup with which the associated object was first created, and the second property indicates a second previous backup in which the associated object was present for a last time, and wherein the second property is left empty after creation of the associated object until the associated object has determined to be no longer present in a present backup;
    determining a first object that is present in a preceding backup but is no longer present in the present backup when or after the present backup is made;
    associating an indicator indicative of the preceding backup with the first object in response to the determination that the first object is no longer present in the present backup, wherein the indicator comprises the second property associated with the first object that indicates the preceding backup in which the first object was present for a last time;
    determining whether the first object is to be deleted from the backup system based on the indicator and a policy during garbage collection; and
    deleting the first object in response to determining that the first object is to be deleted.

2. The method of claim 1, wherein the first object is a data object.

3. The method of claim 1, wherein the first object is a metadata object.

4. The method of claim 1, wherein the first object corresponds to a file, a directory, or a composite.

5. The method of claim 1, wherein the second property that indicates the preceding backup comprises a time of the preceding backup.

6. The method of claim 5, wherein the time is represented in one of: Portable Operating System Interface (POSIX) time or Microsoft time.

7. The method of claim 1, wherein the indicator comprises values of cells in a row corresponding to the first object in a bitmap table, wherein columns of the bitmap table correspond to backups.

8. A non-transitory machine-readable medium having instructions stored therein which, when executed by a processor, cause the processor to perform storage operations, the operations comprising:
    associating each of a plurality of objects on the backup system with a first property and a second property, wherein the first property indicates a first previous backup with which the associated object was first created, and the second property indicates a second previous backup in which the associated object was present for a last time, and wherein the second property is left empty after creation of the associated object until the associated object has determined to be no longer present in a present backup;
    determining a first object that is present in a preceding backup but is no longer present in the present backup when or after the present backup is made;
    associating an indicator indicative of the preceding backup with the first object in response to the determination that the first object is no longer present in the present backup, wherein the indicator comprises the second property associated with the first object that indicates the preceding backup in which the first object was present for a last time;
    determining whether the first object is to be deleted from the backup system based on the indicator and a policy during garbage collection; and
    deleting the first object in response to determining that the first object is to be deleted.

9. The non-transitory machine-readable medium of claim 8, wherein the first object is a data object.

10. The non-transitory machine-readable medium of claim 8, wherein the first object is a metadata object.

11. The non-transitory machine-readable medium of claim 8, wherein the first object corresponds to a file, a directory, or a composite.

12. The non-transitory machine-readable medium of claim 8, wherein the second property that indicates the preceding backup comprises a time of the preceding backup.

13. The non-transitory machine-readable medium of claim 12, wherein the time is represented in one of: Portable Operating System Interface (POSIX) time or Microsoft time.

14. The non-transitory machine-readable medium of claim 8, wherein the indicator comprises values of cells in a row corresponding to the first object in a bitmap table, wherein columns of the bitmap table correspond to backups.

15. A data processing system, comprising:
    a processor; and
    a memory coupled to the processor storing instructions which, when executed by the processor, cause the processor to perform storage operations, the operations including
        associating each of a plurality of objects on the backup system with a first property and a second property, wherein the first property indicates a first previous backup with which the associated object was first created, and the second property indicates a second previous backup in which the associated object was present for a last time, and wherein the second property is left empty after creation of the associated object until the associated object has determined to be no longer present in a present backup;
        determining a first object that is present in a preceding backup but is no longer present in the present backup when or after the present backup is made;
        associating an indicator indicative of the preceding backup with the first object in response to the determination that the first object is no longer present in the present backup, wherein the indicator comprises the second property associated with the first object that indicates the preceding backup in which the first object was present for a last time;
        determining whether the first object is to be deleted from the backup system based on the indicator and a policy during garbage collection; and deleting the first object in response to determining that the first object is to be deleted.

16. The data processing system of claim 15, wherein the first object is a data object.

17. The data processing system of claim 15, wherein the first object is a metadata object.

18. The data processing system of claim 15, wherein the first object corresponds to a file, a directory, or a composite.

19. The data processing system of claim 15, wherein the second property that indicates the preceding backup comprises a time of the preceding backup.

20. The data processing system of claim 19, wherein the time is represented in one of: Portable Operating System Interface (POSIX) time or Microsoft time.

21. The data processing system of claim 15, wherein the indicator comprises values of cells in a row corresponding to the first object in a bitmap table, wherein columns of the bitmap table correspond to backups.

* * * * *